United States Patent Office 3,410,799
Patented Nov. 12, 1968

3,410,799
DYEABLE POLYMERS
Allen Noshay, East Brunswick, and Gabriel Karoly, Elizabeth, N.J., assignors to Esso Research and Engineering Company, a corporation of Delaware
No Drawing. Filed Jan. 6, 1964, Ser. No. 336,050
5 Claims. (Cl. 260—45.75)

ABSTRACT OF THE DISCLOSURE

White dyeable fibers are produced from a polyolefin stabilized with a sulfur-containing stabilizer, by blending the polyolefin prior to spinning with a $C_1$-$C_4$ nickel salt of a monocarboxylic acid.

This invention relates to a process for treating alpha olefin polymers to render them dyeable, and the composition produced thereby.

Poly alpha olefin polymers have found increasing interest as textile fibers and materials because of their desirable properties of strength and low cost. One of the more difficult problems encountered in their development, however, has been the poor dye acceptance of such fibers because of the inertness of a hydrocarbon polymer. Although a poly alpha olefin material, such as polypropylene, can be dyed, its fastness to typical textile environments has been inadequate.

It has now been found that the receptivity of alpha olefin polymers to dyeing may be improved by blending the polymer with 0.1 to 20.0 weight percent, preferably 0.2 to 5.0 weight percent, of a nickel salt of a selected group of organic monocarboxylic acids. The polymer may then be spun into fibers and contacted with dyes. By means of this treatment, not only is the dye uptake of the polymer improved, but more importantly, the resistance of the dyed product to light, washing, and dry cleaning is improved.

An additional and very important advantage of these nickel carboxylate substances is that when the polymer which has been blended with these materials is spun into filaments at high temperature and pressure, the resulting fiber is white.

The fiber does not discolor during this process because these nickel carboxylate substances do not react with the sulfur-containing stabilizers which are often conventionally dispersed in the hot polymer mix. These stabilizers are generally present in amounts of between about 0.1 to 1.0 weight percent preferably 0.3 to 0.8% of the polymer. Some examples of these stabilizing agents which contain sulfur are: di-tert-octyl trisulfide, di-tert-octyl tetrasulfide, 4,4' thiobis(2-t-butyl-5-methylphenol), dilaurylthiodipropionate, distearylthiodipropionate, the esters of polysulfides derived from β-mercaptopropionic acid, and zinc dibutyl dithiocarbamate.

It is not known with certainty why certain compounds will react with sulfur-containing stabilizers in polyolefins while other closely related materials will not; however, it is hypothesized that important factors may be the inherent reactivity of the compound and/or its solubility in the polymer.

While this invention is principally directed to the dyeing of fibers or filaments, it may also be used to dye poly alpha olefin films, foils, and other formed products.

The polymers treated by the process of the invention are alpha olefin homopolymers and copolymers. The alpha olefin homopolymer can be prepared by any known process, such as the so-called Ziegler process, see for example Belgian Patent 533,362 and Belgian Patent 538,782. Examples of homopolymers within the scope of the invention include polyethylene, polypropylene, poly 1-butene and poly 1-heptene. Polymers or copolymers of branched chain alpha olefins where the branching occurs no closer than the third carbon atom can also be employed such as poly 4,4-dimethyl-1-pentene, poly 4-methyl-1-pentene and poly 3-methyl-1-butene. In general, the homopolymers are prepared from alpha olefins having from 2 to 12 carbon atoms. The copolymers employed in the process of the invention include copolymers of two different alpha olefins such as ethylene-propylene copolymers, ethylene-1-hexene copolymers and alpha olefin-aromatic olefin copolymers containing from 1 to 15% by weight of an aromatic olefin, such as for example copolymers of styrene and 4-methyl-1-pentene. Also, blends of one or more of the previously mentioned polymers can be employed. The polymers and copolymers employed in the invention have viscosity average molecular weights ranging from 100,000 to 1,000,000, and are all polymers of hydrocarbon alpha monolefins as can be seen from the above examples. The preferred polymers and copolymers of the invention are those prepared by the use of alkyl metal catalysts. Most preferred is polypropylene. Catalysts which are useful in this process are mixtures of reducible heavy transition metal compounds and reducing metal containing substances, or mixtures of partially reduced heavy transition metal compounds and organometallic activators. Examples of these catalysts are $TiCl_4+AlEt_3$ and $TiCl_3+AlEt_3$. The catalysts used for preparing the preferred polymers employed in the instant process are those catalysts given on page 6, line 20 to page 10, line 21 of copending application Ser. No. 831,210, filed Aug. 3, 1959, now abandoned.

The nickel carboxylates which are useful as chelating substances in this invention are the nickel salts of $C_1$ to $C_4$ monocarboxylic acids. Thus these salts include nickel formate, nickel acetate, nickel propionate, and nickel butyrate. As can be seen from the above examples, these are all saturated alkyl monocarboxylic acids. Nickel acetate is preferred.

It is important to note that nickel salts of higher monocarboxylic acids are not useful in this invention because they react with the sulfur-containing stabilizers and discolor the polymer so that the fibers spun therefrom range in color from gray to black. Actually this discoloration can be clearly observed even if the polymer blend is extruded at relatively low temperatures, although it is more pronounced when the blend is spun, at elevated temperatures, into filaments. Thus inoperative compounds include, for example, nickel pelargonate, nickel myristate, and nickel stearate.

The dyes which are useful in this invention are chelatable dyes. These include the "Koprolene" dyes and the "National Polypropylene" series of dyes produced by the Koppers Company and the National Aniline Company respectively. Examples of these are Koprolene Garnet R, Koprolene Blue R, Polypropylene Violet 3BR, Polypropylene Green B, Polypropylene Brilliant Blue B and Polypropylene Brilliant Orange R. Also useful are ortho hydroxy azo dyes. These dyes include mono-azo dyes, conjugated di- and multi-azo dyes as well as azo-pyrazolone, o,o'-dihydroxy azo and o-hydroxy-o-carboxy azo type dyes. Examples of these are Orasol Yellow 3G (Solvent Yellow 17), Sudan Orange RRA (Solvent Orange 7), Sudan Red 4BA (Oil Red 24), and Oil Red O (Solvent Red 27), and benzothiazole-containing ortho hydroxy azo dyes.

The formulas for some of these ortho hydroxy azo dyes are shown below:

Orasol Yellow 3G (Solvent Yellow 17)

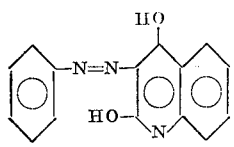

Sudan Orange RRA (Solvent Orange 7)

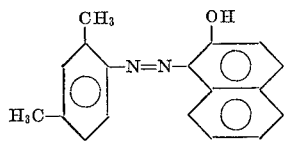

Sudan Red 4BA (Oil Red 24)

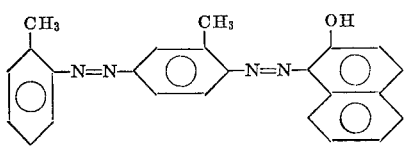

Oil Red O (Solvent Red 27)

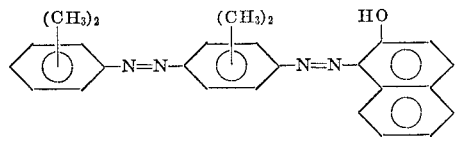

6 methoxy, 2-amino benzothiazole coupled with 3,4 xylenol

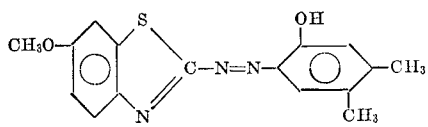

6 methoxy, 2-amino benzothiazole coupled with β-naphthol

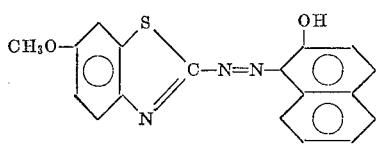

The polymer blend which has been melt spun or extruded into fibers or molded objects is contacted with the aqueous dye bath. In general the dye baths employed contain from 0.1 to 10 weight percent of dye based on the weight of the goods to be dyed. The temperature of dyeing and the time of immersion depend on the concentration of nickel compound in the blend, the particular nickel derivative employed, the concentration of dye employed, and the intensity of color desired. These parameters can easily be determined by routine experimentation. The temperature of dyeing is not critical although the dye bath is usually maintained at the boiling point.

This invention will be more fully understood by reference to the following examples.

Example 1

A polypropylene polymer was formed by passing propylene gas into a dispersion containing $Al(Et)_3$ and $TiCl_3$ in an aromatic diluent at a temperature of 80° C.

Hydrogen was used to control the molecular weight. A crystalline polypropylene resulted having an intrinsic viscosity of 2.0 (in tetralin at 120° C.) and a melt index of 7. This polymer was blended with 0.5 weight percent of dilaurylthiodipropionate as a stabilizer and then spun into fibers by methods known in the art. When these fibers were contacted with the dyes suitable for this invention such as the National Polypropylene dyes, Koprolene dyes, Orasol Yellow 3G, and 6 methoxy, 2-amino benzothiazole coupled with β-naphthol, little dye pickup and essentially no fastness were observed.

Example 2

Commercially available nickel acetate tetrahydrate was dehydrated in a vacuum oven at 125° C. overnight (35% weight loss). 0.33 weight percent of this dehydrated product was blended in a Henschel blender with the stabilized polypropylene of Example 1. This blend was pelletized on a Davis-Standard extruder and spun into 200/34 multifilaments at 570° F. in a pilot plant spinning unit and drawn at a 3.50 draw ratio. The fibers obtained had a tenacity of 5.5 grams per denier, an elongation of 30%, and they were white.

These fibers were contacted with various chelating dyes such as Polypropylene Green B, Polypropylene Brilliant Orange R, and a dye produced by coupling 6 methoxy, 2-amino benzothiazole with β-naphthol. The dyeings were carried out in water at 95° C. for 1 hour in dye baths containing 1 weight percent dyestuff and 0.5 weight percent nonionic surfactant (Igepal—an alkylphenol ethylene oxide condensation product). In all cases the fibers dyed well. The dyed fibers were then examined according to AATCC test procedures and were found to have excellent fastness to washing, dry cleaning, and light.

Example 3

The carboxylates of this invention were compared with other nickel monocarboxylates to indicate their different effect on the color of the undyed polymer.

The following test was developed to indicate which compounds will react with sulfur-containing stabilizers in a polyolefin to discolor the product: A small sample (usually 6 grams) of the blend of nickel carboxylate and stabilized polypropylene powder was placed in a melt index apparatus and was kept there for 15 minutes at 500° F. The resulting extrudate was then examined for discoloration. It was found that the resulting discoloration correlated well with that obtained when the same blend was spun into fibers.

In the table below various nickel carboxylates were blended with low pressure polypropylene obtained as in Example 1 except that different stabilizers were used in some of the runs. The amount of nickel carboxylate was varied in each mixture so that in all cases an equivalent amount of nickel (about 0.10%) was in the blend. An extrudate of each sample (obtained as described above)

was then inspected for discoloration with the results shown below.

| Nickel Carboxylate | Stabilizer | | |
|---|---|---|---|
| | Dilaurylthiodipropionate | Distearylthiodipropionate | 4,4'thiobis(2-t-butyl-5-methylphenol) |
| Ni acetate ($C_2$) | White [1] | White | White. |
| Ni propionate ($C_3$) | do | | |
| Ni butyrate ($C_4$) | do [1] | | |
| Ni benzoate ($C_7$) | Gray | | |
| Ni 2-ethylhexanoate ($C_8$) | do | | |
| Ni pelargonate ($C_9$) | do | | |
| Ni hendecanoate ($C_{11}$) | do | | |
| Ni myristate ($C_{14}$) | do | | |
| Ni stearate ($C_{18}$) | Grayish black [1] | Grayish black | Grayish black. |

[1] Fiber was also spun from this sample; the color of the fiber correlated with that of the extrudate.

This invention has been described in connection with certain specific embodiments thereof; however, it should be understood that these are by way of example rather than by way of limitation, and it is not intended that the invention be restricted thereby.

What is claimed is:

1. A formed dyeable composition of matter which is white, consisting essentially of a polymer of a hydrocarbon alpha monolefin blended with a sulfur-containing stabilizer, capable of reacting with nickel salts of higher monocarboxylic acids, and 0.1 to 20 weight percent of a nickel salt of a $C_1$–$C_4$ alkyl monocarboxylic acid.

2. The composition of claim 1 wherein the polymer is polypropylene.

3. The composition of claim 2 wherein the nickel salt of a $C_1$–$C_4$ monocarboxylic acid is nickel acetate.

4. The composition of claim 3 wherein the sulfur-containing stabilizer is dilaurylthiodipropionate.

5. The composition of claim 4 which contains 0.2 to 5.0 weight percent of nickel acetate.

References Cited

UNITED STATES PATENTS 3,163,492  12/1964  Thomas _____ 8—55
3,240,552  3/1966  Joyner et al. _____ 8—39

DONALD E. CZAJA, *Primary Examiner.*

V. HOKE, *Assistant Examiner.*